United States Patent [19]
Rochette

[11] Patent Number: 5,386,811
[45] Date of Patent: Feb. 7, 1995

[54] DEVICE FOR RECOVERY OF FUEL VAPORS

[75] Inventor: Bertrand Rochette, Jouy en Josas, France

[73] Assignee: Regie Nationale Des Usines Renault, Boulogne-Billancourt, France

[21] Appl. No.: 125,217

[22] Filed: Sep. 23, 1993

[30] Foreign Application Priority Data

Sep. 18, 1992 [FR] France .................. 92 11138

[51] Int. Cl.⁶ .............................................. F02M 37/04
[52] U.S. Cl. ...................................... 123/519; 180/69.4
[58] Field of Search ............... 123/518, 519, 520, 521, 123/516, 557; 180/69.4, 69.5, 225, 296

[56] References Cited

U.S. PATENT DOCUMENTS

| | | | |
|---|---|---|---|
| 2,253,438 | 8/1941 | Lutz | 180/69.5 |
| 3,491,736 | 1/1970 | Walker | 123/521 |
| 4,598,686 | 7/1986 | Lupoli | 123/519 |
| 4,727,955 | 3/1988 | Honda | 123/519 |
| 4,778,495 | 10/1988 | Bishop | 123/519 |
| 4,846,135 | 7/1989 | Tiphaine | 123/520 |
| 4,886,096 | 12/1989 | Reddy | 123/518 |
| 4,940,101 | 7/1990 | Bauder | 180/69.4 |
| 4,945,885 | 8/1990 | Gonze | 123/518 |
| 5,273,020 | 12/1993 | Hayami | 123/520 |

FOREIGN PATENT DOCUMENTS

| | | | |
|---|---|---|---|
| 0063514 | 5/1977 | Japan | 123/519 |
| 0000544 | 1/1981 | Japan | 123/519 |
| 0220951 | 12/1983 | Japan | 123/520 |
| 0094063 | 4/1988 | Japan | 123/519 |
| 0192948 | 8/1988 | Japan | 123/519 |

*Primary Examiner*—Carl S. Miller
*Attorney, Agent, or Firm*—Oblon, Spivak, McClelland, Maier & Neustadt

[57] ABSTRACT

Device for recovery of fuel-vapors from a tank of a motor vehicle includes a filter (1) containing a material that adsorbs these vapors, this filter (1) being connected by a pipe (3) to a source of air for regeneration of the adsorbent material. The intake opening of the pipe (3) comes out in the vicinity of temperature exchanging means element of the engine cooling system.

7 Claims, 2 Drawing Sheets

DEVICE FOR RECOVERY OF FUEL VAPORS

BACKGROUND OF THE INVENTION

1. Field of the Invention

This invention relates to a device for recovery of the fuel vapors coming from the fuel tank of a motor vehicle equipped with an internal combustion engine.

2. Description of the Related Art

To reduce the vaporization to the air of fuel carried by motor vehicles, vaporization that is the cause of significant pollution of the atmosphere, it is known to use devices for recovery of these vapors. These devices traditionally comprise a filter, also called a canister, which contains a material that adsorbs the fuel vapors. This filter traditionally is connected by a first pipe to the upper part of the fuel tank, by a second pipe to a partial vacuum source which generally consists of the combustion agent air intake system of the engine, and by a third pipe to a source of air for regeneration of the adsorbent material.

These devices thus make it possible to trap the fuel vapors that come from the tank. The material that adsorbs these vapors can be activated carbon which fills up with fuel vapors when the gas current goes from the first pipe to the second by passing through the filter and that is regenerated when it is scavenged in counterflow by the regeneration air passing from the third pipe to the second. This scavenging is performed by suction in the second pipe, a suction due in particular to the partial vacuum in the intake system of the engine when it is operating.

The effectiveness of these devices for recovery of fuel vapors depends on their ability to regenerate the adsorbent material. It is known that such a regeneration is improved if the scavenging or purging air has a sufficient temperature and for this reason, in an arrangement disclosed by patent application FR 87/10830, it has been provided to perform a regulated heating of this air. However, the use of a specific heating system for the regeneration air exhibits the drawback of complicating the device for recovery of the gasoline vapors and, consequently, of increasing its cost.

SUMMARY OF THE INVENTION

An object of this invention is therefore to make possible an effective operation of the device for recovery of fuel vapors while eliminating any specific heating system.

The device for recovery of the fuel vapors from a tank of a motor vehicle, according to the invention, comprises a filter containing a material that adsorbs these vapors, this filter being connected by a pipe to a source of air for regeneration of the adsorbent material.

According to the invention, the device for recovery of the fuel vapors is characterized in that the intake opening of the regeneration air intake pipe comes out in the immediate vicinity of temperature exchanging means that equip the engine cooling system.

According to another characteristic of the device that is the object of the invention, the temperature exchanging means are formed by a radiator of the type having two radiator tanks connected by a core of finned tubes and in that the filter is directly fastened to one of the radiator tanks so as to present the intake opening of the regeneration air intake pipe at right angles with the core in the flow of hot air.

According to another characteristic of the device that is the object of the invention, the filter extends in the lateral extension of the radiator outside the flow of hot air.

According to another characteristic of the device that is the object of the invention, the filter is positioned on the radiator tank by pivot pin suspension means.

According to another characteristic of the device that is the object of the invention, the suspension means are formed by two hinges of the type comprising a male knuckle and a female knuckle, making possible an easy mounting and removal of the filter on the associated radiator tank.

According to another characteristic of the device that is the object of the invention, the filter and the associated radiator tank exhibit corresponding fastening lugs making possible the anchoring of the filter on the radiator tank by a simple mounting screw.

BRIEF DESCRIPTION OF THE DRAWINGS

The objects, aspects and advantages of this invention will be better understood from the description given below of an embodiment of the invention, offered by way of nonlimiting example, by referring to the accompanying drawing, in which.

DETAILED DESCRIPTION OF THE PREFERRED EMBODIMENTS

According to the figures, only the elements necessary for understanding the invention have been represented.

Figure 1:
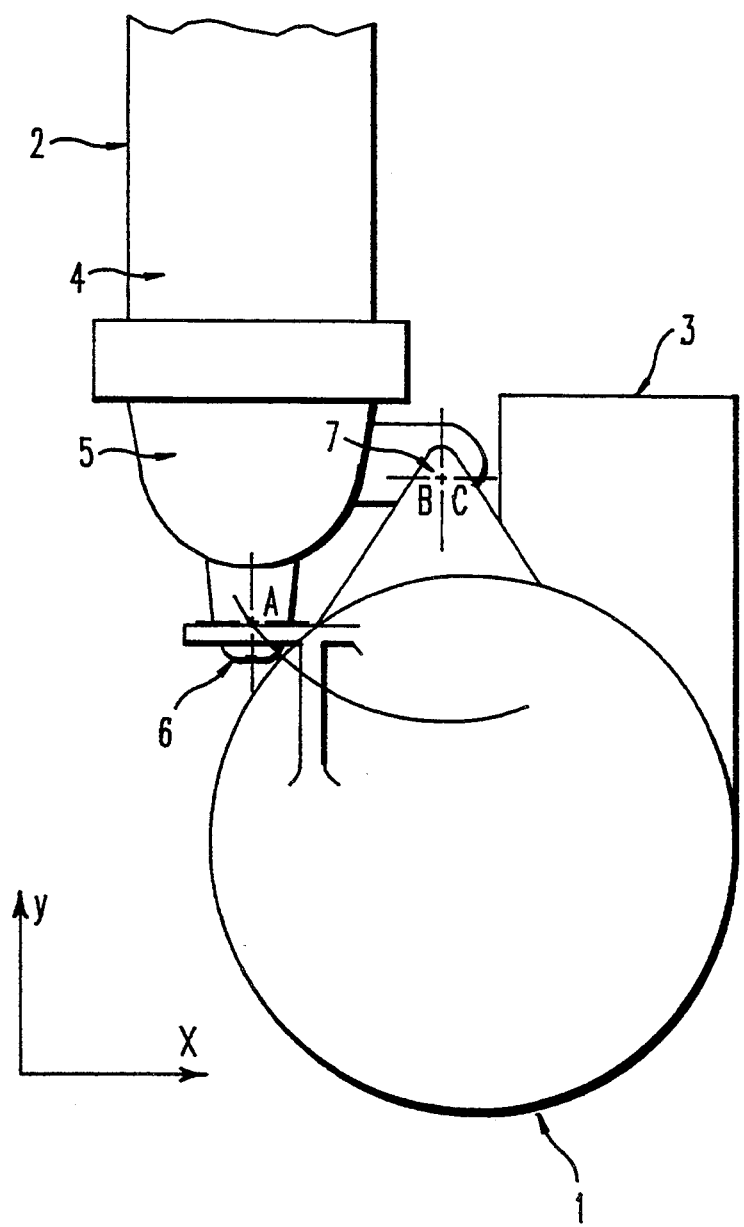
FIG. 1 is a partial top view of the device for recovery of fuel vapors according to the invention.
Figure 2:
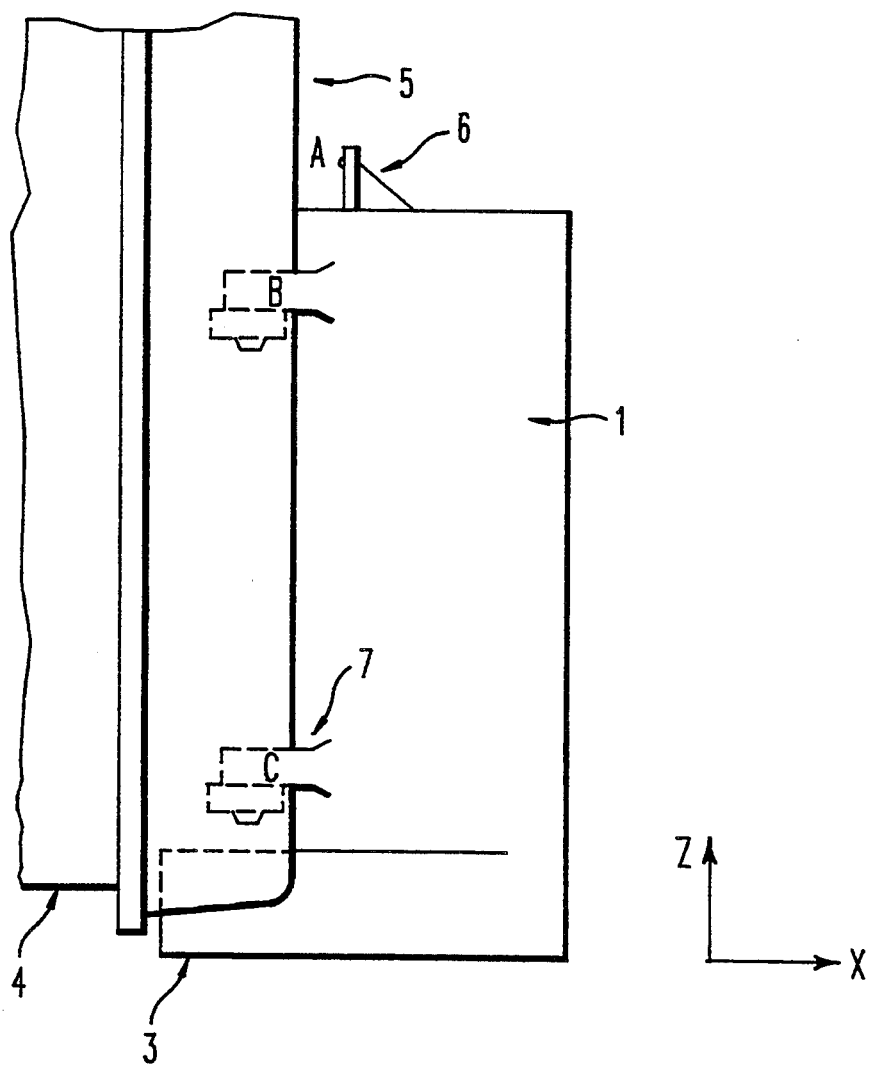
FIG. 2 is a partial front view of the device for recovery of fuel vapors according to the invention.

FIGS. 1 and 2 represent a fuel vapor filter referenced 1. This filter contains a material, for example activated carbon, able to adsorb the fuel vapors formed in the fuel tank of a vehicle equipped with an internal combustion engine.

The filter is traditionally connected to the upper part of the fuel tank by a pipe not shown, another pipe not shown connects the filter to a partial vacuum source that is preferably the combustion agent gas intake pipe of the engine.

The filter is finally connected by a pipe 3 to a source of air for regeneration of the activated carbon.

The intake opening of this regeneration air intake pipe comes out directly behind heat exchanging radiator 2 of the engine cooling system so as to be able to draw off the hot air.

Thus, during the filter regeneration phase which is performed in the operating phase of the engine, the scavenging air has a sufficient temperature to bring about the desorption of the fuel vapors of the activated carbon. The temperature of the hot air thus drawn off is further regulated by the fan power unit of the vehicle, which prevents any danger of overheating of the activated carbon that could cause its deterioration.

To make it possible to position the intake opening of the regeneration air intake pipe 3 in the flow of hot air of radiator 2, filter 1 is directly mounted on radiator 2, which offers, in addition, a particularly simple and clever method of installing the filter on the vehicle.

Radiator 2 is a water/air heat exchanger used to lower, by a current of atmospheric air, the temperature of the cooling liquid, which was heated while passing through the engine housing and the cylinder head.

Radiator 2 exhibits two vertical radiator tanks, performing the function of inlet and outlet tank for the cooling liquid, connected horizontally by a core of finned tubes.

The filter is therefore positioned on one of the radiator tanks 5 so as to present the intake opening of the regeneration air intake pipe at right angles with core 4. The positioning is achieved thanks to pivot pin suspension means 7, in this case two simple hinges of the type comprising a male knuckle carrying the pivot pin integral with filter 1, and a female knuckle integral with the radiator tank. Such a system makes possible a particularly simple mounting of the filter. The securing of filter 1 on radiator tank 5 is assured by the screwing of a screw 6 through two corresponding fastening lugs integral respectively with filter 1 and radiator tank 5.

To avoid too considerable a heating of filter 1, which could be harmful particularly in the vapor adsorption phase, the filter is positioned in the coldest region of radiator 2, i.e., in the lower part of radiator tank 5, the cooling liquid circulating downward in the radiator. In addition, the filter is positioned in the extension of the radiator so as to be outside the flow of hot air.

Of course, the invention is in no way limited to the embodiment described and illustrated which has been give only by way of example.

Rather, the invention comprises all the technical equivalents of the means described as well as their combinations if they are made in its spirit.

I claim:

1. Device for recovery of fuel vapors from a fuel tank in a motor vehicle having an engine cooling system including a heat exchanger which heats a flow of air, comprising:

a filter unit including a regenerable fuel vapor adsorption material;

a first pipe communicating said filter unit to a fuel tank so as to supply fuel vapors to the fuel vapor adsorption material; and a second pipe supplying a source of regenerative air to the fuel vapor adsorption material, wherein said second pipe has an intake opening for the regenerative air, said intake opening being positioned directly behind said radiator and adjacent the flow of heated air so as to draw a portion of the flow of heated air into said second pipe.

2. The device of claim 1 wherein said heat exchanger comprises a radiator including two radiator tanks connected by a core of finned tubes, wherein said filter unit is fastened to one of said tanks.

3. The device of claim 1 wherein said filter unit is positioned outside of the heated air flow.

4. The device of claim 2 wherein said filter unit is pivotally mounted on said one of said radiator tanks via a pivot pin.

5. The device of claim 4 wherein said pivot pin comprises a male knuckle fittable in a female knuckle.

6. The device of claim 4 wherein said filter unit and said one of said radiator tanks comprise corresponding fastening lugs, including a screw securing said lugs to one another.

7. The device of claim 2 wherein said one of said tanks extends substantially vertically and said filter unit is fastened to a lower end of said at least one of said tanks, and wherein said second pipe is adjacent a bottom of said one of said tanks.

* * * * *

UNITED STATES PATENT AND TRADEMARK OFFICE
CERTIFICATE OF CORRECTION

PATENT NO. : 5,386,811
DATED : February 7, 1995
INVENTOR(S) : Bertrand ROCHETTE

It is certified that error appears in the above-indentified patent and that said Letters Patent is hereby corrected as shown below:   On the title page:

Please delete the Foreign Application Priority Data, Item [30], from the title page.

Signed and Sealed this

Twenty-seventh Day of June, 1995

Attest:

BRUCE LEHMAN

*Attesting Officer*      *Commissioner of Patents and Trademarks*